(12) United States Patent
Etter

(10) Patent No.: US 7,100,703 B2
(45) Date of Patent: Sep. 5, 2006

(54) GOLF GREEN ROLLER APPARATUS

(76) Inventor: John D. Etter, 320 W. 21st St., Wayne, NE (US) 68787

( * ) Notice: Subject to any disclaimer, the term of this patent is extended or adjusted under 35 U.S.C. 154(b) by 115 days.

(21) Appl. No.: 10/909,356

(22) Filed: Aug. 3, 2004

(65) Prior Publication Data
US 2006/0027382 A1  Feb. 9, 2006

(51) Int. Cl.
  A01B 63/14  (2006.01)
  A01B 15/00  (2006.01)
  A01B 19/10  (2006.01)
  E01C 19/00  (2006.01)

(52) U.S. Cl. .................. 172/315; 172/605; 172/681; 172/684.5; 404/85

(58) Field of Classification Search .............. 172/605, 172/490, 315, 680, 684.5; 404/122, 131, 404/85; 56/7
See application file for complete search history.

(56) References Cited

U.S. PATENT DOCUMENTS

| | | | | |
|---|---|---|---|---|
| 242,022 | A * | 5/1881 | Morgan | 56/348 |
| 3,477,535 | A * | 11/1969 | Wyatt | 180/20 |
| 3,873,228 | A * | 3/1975 | Dunham | 404/128 |
| 3,905,716 | A | 9/1975 | Farkas | |
| 3,942,027 | A * | 3/1976 | Fima | 307/10.1 |
| 3,986,782 | A | 10/1976 | Durham | |
| 4,046,399 | A * | 9/1977 | Zeuner et al. | 280/420 |
| 4,378,052 | A | 3/1983 | Anderson | |
| 4,481,757 | A | 11/1984 | Tsuchiya | |
| 4,988,258 | A * | 1/1991 | Lutz et al. | 414/500 |
| 5,228,799 | A * | 7/1993 | Sondreal | 404/124 |
| 5,613,565 | A * | 3/1997 | Kelly | 172/21 |
| 5,676,490 | A * | 10/1997 | Nelson | 404/94 |
| 5,870,888 | A | 2/1999 | Pugh | |
| 6,612,773 | B1 * | 9/2003 | Gray | 404/94 |
| 6,675,906 | B1 * | 1/2004 | Mathiowetz | 172/174 |
| 6,708,777 | B1 * | 3/2004 | Holmes | 172/684.5 |
| 6,840,543 | B1 * | 1/2005 | Dufty | 280/789 |
| 2001/0039788 | A1 | 11/2001 | Starr | |

* cited by examiner

Primary Examiner—Daniel P. Stodola
Assistant Examiner—Julianne Cozad
(74) Attorney, Agent, or Firm—Richard C. Litman

(57) ABSTRACT

A golf green roller apparatus that can be hitched to a golf cart or any vehicle utilizing a clevis pin-type coupler. The roller is mounted on an articulated frame. A pair of wheels having tires thereon is also mounted on the frame. An easy-to-operate electric actuator functions to lower or raise the wheels while simultaneously lowering or raising the roller. When the wheels are lowered, the roller is raised to a storage position. Conversely, when the wheels are raised the roller is lowered to contact the surface to be rolled. The electric actuator can be powered by a twelve-volt battery. Connector cables are provided so that the roller apparatus can be easily attached to the battery of a golf cart or the like.

8 Claims, 4 Drawing Sheets

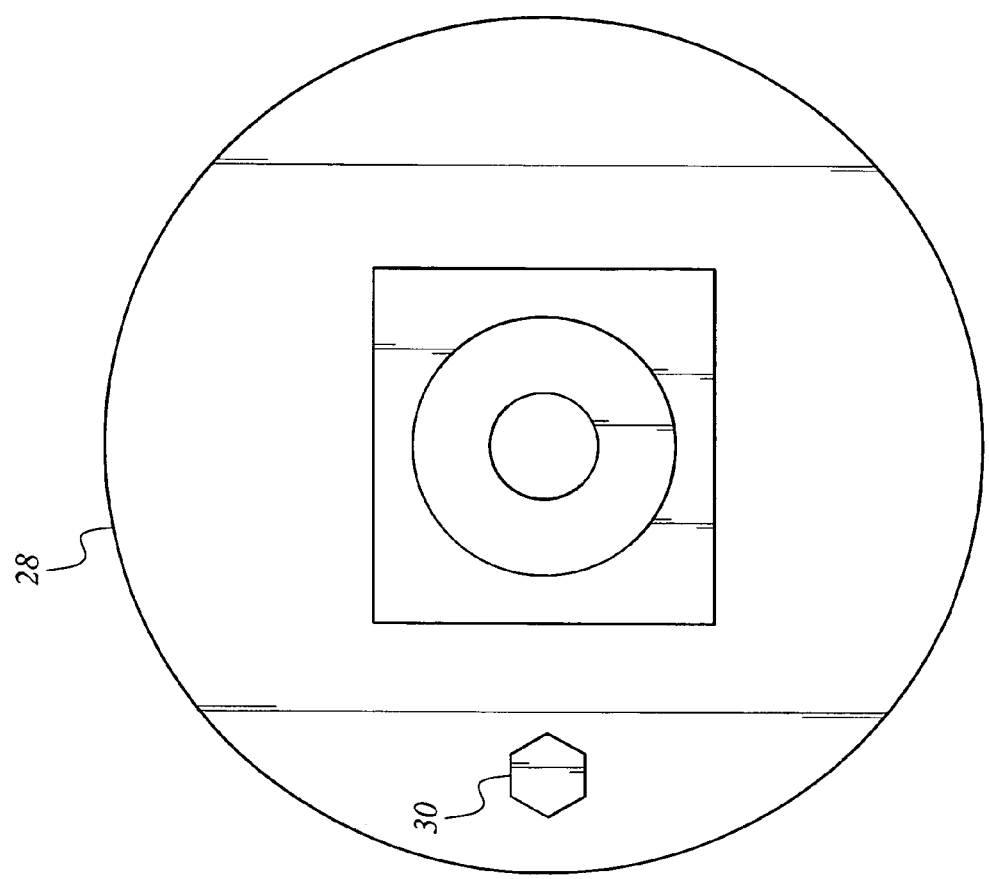

GOLF GREEN ROLLER APPARATUS

BACKGROUND OF THE INVENTION

1. Field of the Invention

The present invention generally relates to landscaping equipment. More specifically, the present invention is drawn to a golf green roller with an electric actuator therefor.

2. Description of the Related Art

The task of maintaining a properly landscaped golf course requires a great deal of meticulous work. Golfers are very vocal in criticizing management if there is something amiss on the fairways or if the traps are in disarray. The criticism might reach ballistic levels if the greens are unkempt and putting is affected. This scenario puts pressure on management and the grounds-keeping staff to maintain the course in general and the greens in particular in the best possible condition. Greens need to be rolled constantly to eliminate imperfections in the turf so that the speed and trajectory of the ball is consistent. Proper rolling allows green speed to be maintained during heat stress periods without mowing the greens abnormally short. Unfortunately, the equipment needed for keeping a green in top shape is somewhat expensive, and attaining such equipment can put quite a strain on the budgets of small municipal and/or private courses. The art would certainly welcome an inexpensive, easy-to-operate roller for golf greens that can be towed by a golf truckster, golf cart or any vehicle having a clevis hitch.

U.S. Pat. No. 4,481,757 (Tsuchiya) discloses a mower having a vertically adjustable lawn-conditioning roller. Unlike the present invention, the roller disclosed in the patent does not eliminate imperfections in the turf by compacting, but functions to raise the grass for a more precise cut.

U.S. Patent Application Publication No. 2001/0039788 A1 (Starr) is drawn to a combination mower and rolling apparatus. It should be noted that the roller is not effective to smooth out imperfections in the turf by compacting. The apparatus also requires manual pushing thereof.

U.S. Pat. No. 5,870,888 (Pugh) shows a power lawn mower having an attached roller. The roller is not of a size and weight to compact turf.

U.S. Pat. No. 3,905,716 (Farkas) discloses a lawn roller device for a garden tractor. The device is relatively expensive and employs complicated idler and drive mechanisms permanently connected to the tractor.

U.S. Pat. No. 3,986,782 (Durham) is drawn to a towed roller wherein the roller drum can be raised to a storage position. The patentee relies on a complicated hydraulic system to raise and lower the roller.

U.S. Pat. No. 4,378,052 (Anderson) shows a roller attachment for a tractor. No provision is made for disengaging the roller from contact with the ground.

None of the above inventions and patents, taken either singly or in combination, is seen to disclose a roller apparatus as will be subsequently described and claimed in the instant invention.

SUMMARY OF THE INVENTION

The present invention is a golf green roller apparatus that can be hitched to a golf cart or any vehicle utilizing a clevis pin-type coupler. The roller is rotatably mounted on an articulated frame. A pair of wheels having tires thereon is also mounted on the frame. An easy-to-operate electric actuator functions to lower or raise the wheels while simultaneously lowering or raising the roller. When the wheels are lowered, the roller is raised to a storage position. Conversely, when the wheels are raised the roller is lowered to contact the surface to be rolled. The electric actuator can be powered by a twelve-volt battery. Connector cables are provided so that the roller apparatus can be easily attached to the battery of a golf cart or the like. The roller is hollow and may be filled with liquid to increase its weight if desired. The roller apparatus can be hooked to a vehicle in approximately two or three minutes.

Accordingly, the present invention presents a roller apparatus that can be used with conventional golf carts and/or golf trucksters. The apparatus employs an electric actuator to engage and disengage the roller from the ground.

The invention provides for improved elements and arrangements thereof for the purposes described which are inexpensive, dependable and fully effective in accomplishing their intended purposes.

A clear understanding of the present invention will become readily apparent upon further review of the following specification and drawings.

BRIEF DESCRIPTION OF THE DRAWINGS

FIG. 4 is an end view of a roller for a golf green roller according to the present invention.

Similar reference characters denote corresponding features consistently throughout the attached drawings.

DETAILED DESCRIPTION OF THE PREFERRED EMBODIMENT

Figure 1:
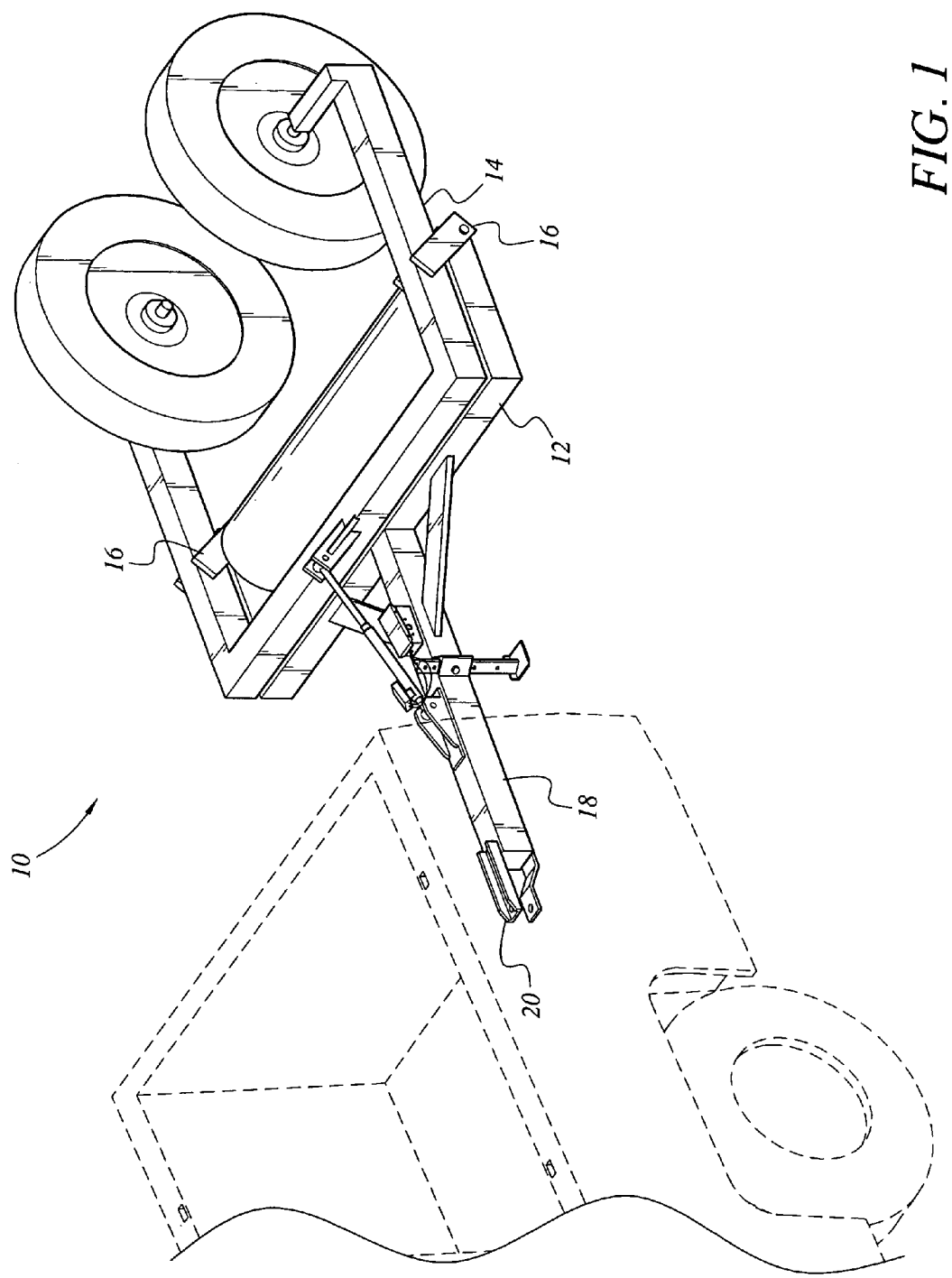
FIG. 1 is an environmental, perspective view of a golf green roller according to the present invention.
Figure 2:
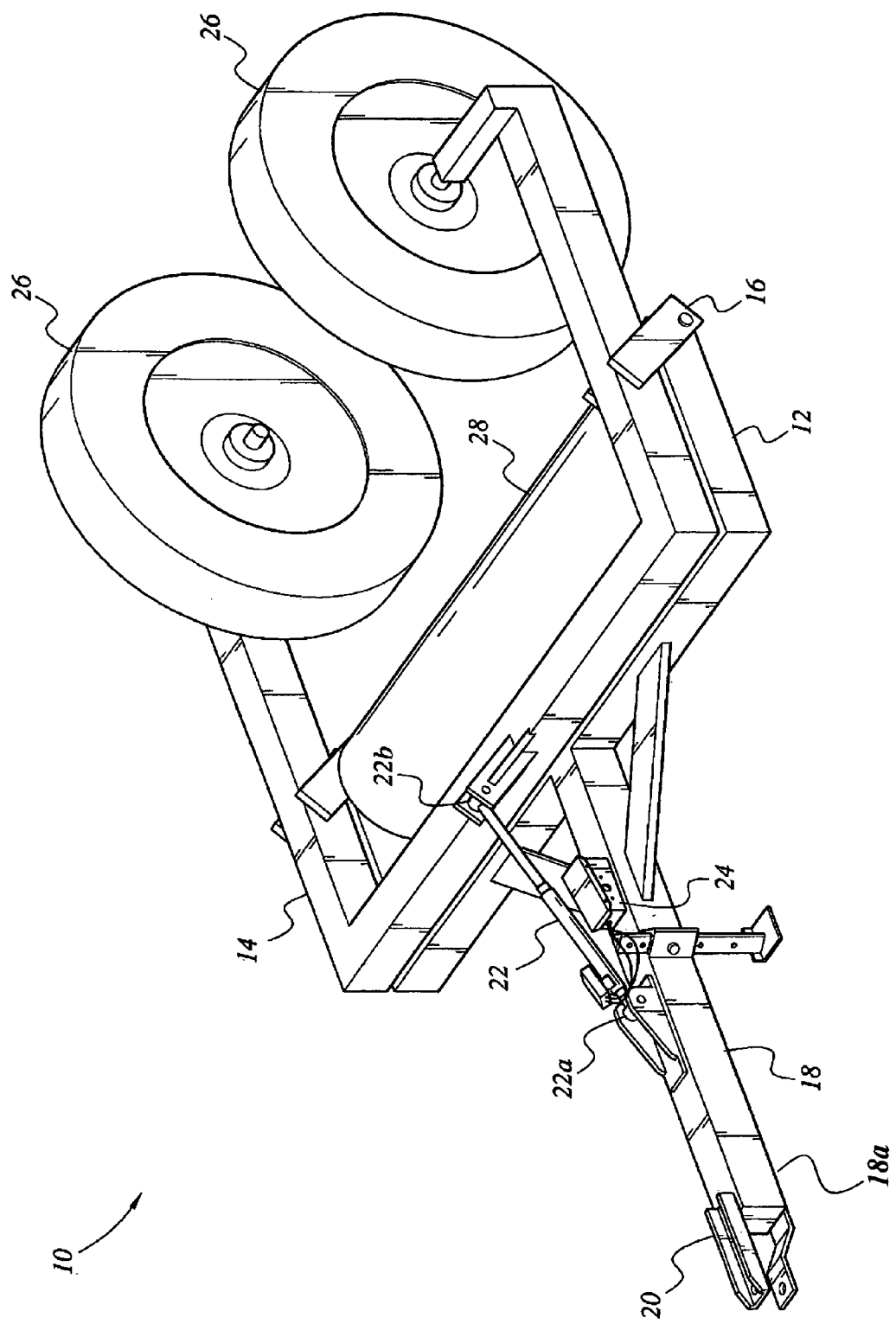
FIG. 2 is a perspective view of a golf green roller according to the present invention.

Attention is first directed to FIGS. 1 and 2 wherein the green roller of the present invention is indicated generally at 10. Roller 10 comprises articulated frame members 12 and 14. Lower frame member 12 is pivotally attached adjacent its rear, via flat bar members 16, to a mid area of upper frame member 14. A towing tongue 18 extends from the front face of lower frame member 12. The free end 18a of tongue 18 terminates in a coupling 20 for attaching the tongue to the hitch (not shown) of a golf cart, golf truckster or the like. An electrically powered actuator 22 has a distal end 22a pivotally attached on the top surface of tongue 18. The proximate end 22b of actuator 22 is pivotally coupled at the front face of upper frame member 14. Actuator 22 can be selected from a variety of conventional, electrically powered, heavy-duty screw actuators. An electrical box 24, whose purpose will be explained below, is disposed on the upper surface of towing tongue 18. A pair of 18.5×8.5–8 flotation-type tires 26 is mounted at the rear of frame 14. A roller 28 has its ends rotatably secured in the inner surfaces adjacent the rear end of lower frame member 12. Roller 28 is a hollow, cylindrical body fabricated from durable metal. The cylindrical wall is approximately ⅜" thick. One end plate of roller 28 (FIG. 4) is provided with a fill hole 30 having a removable plug therefor. The empty weight of the roller is approximately 450 lbs. The weight of the roller may be increased by adding fluids via fill hole 30. A freeze deterrent (antifreeze or the like) is recommended to eliminate the possibility of freeze damage if the roller is to be stored in freezing temperatures.

Figure 3:
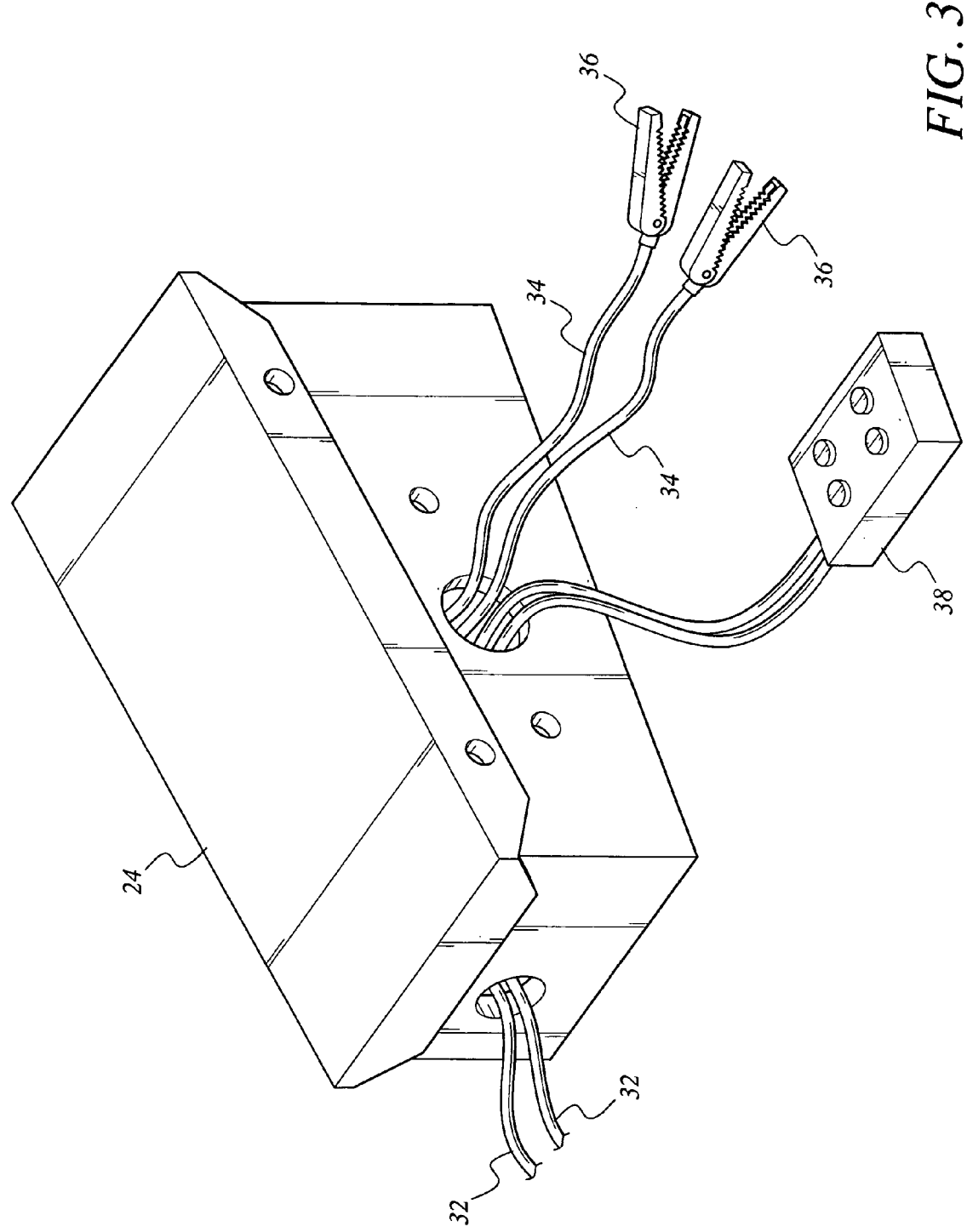
FIG. 3 is a perspective view of an electric box for a golf green roller according to the present invention.

As best seen in FIG. 3, a housing or electrical box 24 is provided to contain the necessary switches and relays (not shown) to provide electrical motive power to actuator 22. Current carrying wires 32 extend from box 22 and are connected to actuator 22. Power cords 34 have ends defined by alligator clip connectors 36, which clips are connectable to the terminals of the twelve volt battery of the golf cart or golf truckster. A hand held control module 38 allows a user to regulate power supply to the actuator.

Using the green roller of the present invention is extremely easy. One simply hitches the coupling 20 to the vehicle of choice for transporting to the green to be treated. Alligator clips 36 are connected to the terminals of the vehicle's twelve volt battery. Operation of the control module 38 powers actuator 22 to pivot frame member 14 relative to frame member 12 raising tires 26, which tires are disengaged from the green. Simultaneously, roller 26 is lowered to engage the green. The vehicle can now pull the roller over the green for efficient and effective grooming. The above procedure is reversed when green rolling is finished.

It is to be understood that the present invention is not limited to the embodiment described above, but encompasses any and all embodiments within the scope of the following claims.

I claim:

1. A golf green roller, comprising:
   a lower frame member having a front face and a rear end, said lower frame member having a width;
   an upper frame member having a front face, a rear end and a mid area located approximately midway between the front face and the rear end of said upper frame member, said upper frame member positioned above and overlapping said lower frame member, wherein the rear end of said lower frame member is pivotally attached to said upper frame member at the mid area;
   a towing tongue attached directly to the front face of said lower frame member and extending therefrom, said towing tongue having an upper surface;
   an electrically powered screw actuator having a distal end and a proximate end, wherein the distal end is pivotally attached to said towing tongue and the proximate end is pivotally attached at the front face of said upper frame member;
   a pair of flotation tires mounted on the rear end of said upper frame member; and
   a cylindrical roller for rolling and compacting a golf green, said cylindrical roller attached to said lower frame member and extending across the entire width of said lower frame member.

2. The golf green roller according to claim 1, further including an electrical control box mounted on the upper surface of said towing tongue.

3. The golf green roller according to claim 1, wherein said towing tongue has a free end defining a hitch coupling.

4. A golf green roller, comprising:
   a lower frame member having a front face and a rear end;
   an upper frame member having a front face, a rear end and a mid area located approximately midway between the front face and the rear end of said upper frame member, said upper frame member positioned above and overlapping said lower frame member, wherein the rear end of said lower frame member is pivotally attached to said upper frame member at the mid area;
   a towing tongue attached directly to the front face of said lower frame member and extending therefrom, said towing tongue having an upper surface and a free end;
   an electrical box mounted on said upper surface of the towing tongue, said electrical box having plural openings therein;
   an electrically powered screw actuator having a distal end and a proximate end, wherein the distal end is pivotally attached to said towing tongue and the proximate end is pivotally attached at the front face of said upper frame member;
   electric current carrying cords extending from one of said plural openings, said electric current carrying cords being connected to said screw actuator;
   a pair of flotation tires mounted on the rear end of said upper frame member; and
   a cylindrical roller for rolling and compacting a golf green, said cylindrical roller attached to said lower frame member and extending across the entire width of said lower frame member.

5. The golf green roller according to claim 4, further including a pair of power cords extending from another of said plural openings, said power cords having ends defined by alligator clips.

6. The golf green roller according to claim 4, further including a hand control module electrically connected to said electrical box.

7. The golf green roller according to claim 4, wherein said hollow cylindrical roller has an end plate, an opening disposed through said end plate and a removable plug for closing said opening.

8. The golf green roller according to claim 4, wherein said roller weighs approximately 450 lbs.

* * * * *